(12) United States Patent
Kudo et al.

(10) Patent No.: US 7,596,061 B2
(45) Date of Patent: Sep. 29, 2009

(54) OPTICAL DISK APPARATUS

(75) Inventors: Hiromi Kudo, Chigasaki (JP); Takahiro Kurokawa, Fujisawa (JP); Takeshi Shimano, Yokohama (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 11/363,956

(22) Filed: Mar. 1, 2006

(65) Prior Publication Data
US 2007/0183274 A1 Aug. 9, 2007

(30) Foreign Application Priority Data
Feb. 3, 2006 (JP) ............... 2006-027154

(51) Int. Cl.
*G11B 7/00* (2006.01)
(52) U.S. Cl. ............... 369/44.23; 369/53.25; 369/53.28
(58) Field of Classification Search ............... 369/53.25
See application file for complete search history.

(56) References Cited
U.S. PATENT DOCUMENTS

| 2001/0028614 | A1 | 10/2001 | Furukawa | |
| 2004/0017742 | A1* | 1/2004 | Iwata | 369/44.32 |
| 2005/0063259 | A1 | 3/2005 | Isshiki et al. | |
| 2005/0151052 | A1* | 7/2005 | Jutte et al. | 250/201.5 |
| 2006/0050620 | A1* | 3/2006 | Spruit | 369/125 |

FOREIGN PATENT DOCUMENTS

| JP | 2000-011388 | 1/2000 |
| JP | 2001-222838 | 8/2001 |
| JP | 2005-100483 | 4/2005 |

* cited by examiner

*Primary Examiner*—Wayne R Young
*Assistant Examiner*—Adam R Giesy
(74) *Attorney, Agent, or Firm*—Antonelli, Terry, Stout & Kraus, LLP.

(57) ABSTRACT

An optical disk apparatus for correcting astigmatism that influences the read/write. If there is astigmatism, and autofocus and tracking control are in operation, then a push-pull signal amplitude and a 2T signal amplitude vary with the variation of an amount of spherical aberration, resulting in two cases. In one case, the amount of spherical aberration to give the maximum value of push-pull signal amplitude agrees with the amount of spherical aberration to give the maximum value of 2T signal amplitude, and in the other case the two amounts do not agree. If there is no astigmatism, two amounts agree each other. If there in no agreement, then correction is made by using an astigmatism correcting element until the agreement is reached between the two. In the case where two amounts agree, specification is made for the existence and angle of astigmatism, and correction is made by using focus error signals from adjacent tracks.

14 Claims, 11 Drawing Sheets

NO ASTIGMATISM

CONTOUR LINE OF PUSH-PULL SIGNAL

CONTOUR LINE OF 2T MARK SIGNAL AMPLITUDE

ASTIGMATISM 0.294λ (0deg.)

CONTOUR LINE OF PUSH-PULL SIGNAL

CONTOUR LINE OF 2T MARK SIGNAL AMPLITUDE

ASTIGMATISM 0.294λ (45deg.)

CONTOUR LINE OF PUSH-PULL SIGNAL

+

CONTOUR LINE OF 2T MARK SIGNAL AMPLITUDE

↓

ASTIGMATISM 0.294λ (90deg.)

CONTOUR LINE OF PUSH-PULL SIGNAL

CONTOUR LINE OF 2T MARK SIGNAL AMPLITUDE

ASTIGMATISM 0.294λ (135deg.)

CONTOUR LINE OF PUSH-PULL SIGNAL

CONTOUR LINE OF 2T MARK SIGNAL AMPLITUDE

NO ASTIGMATISM

ASTIGMATISM
0.294λ (45deg.)

ASTIGMATISM
0.294λ (135deg.)

EXAMPLE OF ELECTRODE PATTERN OF ASTIGMATISM CORRECTING ELEMENT
(LIQUID CRYSTAL ELEMENT)

EXAMPLE OF ADDED PHASE FOR CORRECTING
0 DEGREE (90 DEGREES) ASTIGMATISM

EXAMPLE OF ADDED PHASE FOR CORRECTING
45 DEGREE (135 DEGREES) ASTIGMATISM

FIG. 11

| FOCUS ERROR SIGNAL [Arb.Unit] | ASTIGMATISM CORRECTION AMOUNT [$\lambda$] |
|---|---|
| 0.18 | 0.1 |
| 0.25 | 0.2 |
| 0.3 | 0.3 |

OPTICAL DISK APPARATUS

CLAIM OF PRIORITY

The present application claims priority from Japanese application JP2006-27154 filed on Feb. 3, 2006, the content of which is hereby incorporated by reference into this application.

FIELD OF THE INVENTION

The present invention relates to an optical disk, and more particularly, to a method for correcting astigmatism in an optical disk apparatus.

BACKGROUND OF THE INVENTION

A demand for a high density optical disk with a memory capacity equal to or larger than 20 GB has been increasing for storing image data used in High-Definition TV (HDTV) broad casting and the like. To meet this demand various techniques have been reported from the companies concerned, wherein an optical disk is included called a Blue-ray Disk (BD). A DVD-R/RW or DVD-RAM widely used in the market at present, reads or writes data employing a semiconductor laser with a wave length of 650 nm and an objective lens with a numerical aperture (NA) of 0.6, whereas a BD employs a blue semiconductor laser with a wave length of 405 nm and an objective lens with the NA of 0.85, enabling an optical spot diameter very small.

Problems for the read/write techniques employing those optical systems are defocus, astigmatism caused by an inclined objective lens, coma-aberration caused by an inclined disk with respect to an optical axis, and a spherical aberration caused by the thickness deviation of cover layer and the like. These effects increase approximately proportional to the NA squared, the NA squared, a third power of the NA, and the fourth power of the NA, respectively, resulting in poor read/write. As for correcting the defocus and spherical aberrations, a technique of prior art employs, for example, as disclosed in JP Patent Publication (Kokai) No. 2001-222838A, a configuration wherein correction for the spherical aberration is made by varying the amount of correction, while holding the objective lens at a position wherein the amplitude of reproduced signal becomes maximum. The final amount of correction is determined and used as the one that produces the maximum amplitude of tracking error signal. Another technique disclosed in JP Patent Publication (Kokai) No. 2000-11388A, optimizes the distance between two group objective lenses, and at the same time, the off-set values in focus control operation based on the reproduced signals. Still another technique disclosed in JP Patent Publication (Kokai) No. 2005-100483A, utilizes the amplitude of tracking error signal to control spherical aberration and focal point position simultaneously, and then utilizes the reproduced signal amplitude to fine control the aberration and focal point position.

SUMMARY OF THE INVENTION

An optical disk apparatus is currently available thereto mounted functions of correction for defocus, spherical aberration, or coma aberration. On the other hand, an optical apparatus is scarcely available thereto mounted any correction parts or control systems for correcting astigmatism mainly caused by an inclined object lens, in spite of the fact that it increases proportional to the NA squared in a similar way to the defocus effect. Thus, it is difficult to excellent read/write at the present stage.

An object of the present invention is to provide an optical disk apparatus, in which the amount and the angular direction of astigmatism are detected, and an appropriate correcting method can be applied thereto.

In the present invention, while the focus of an object lens is adjusted based on a focus error signal, and tracking is performed based on a push-pull signal, the amount of spherical aberration(BE1) that yields the maximum amplitude of the push-pull signal, and the amount of spherical aberration (BE2) that yields the maximum amplitude of the reproducing signal are detected, by reading a push-pull signal and a reproducing signal from an optical disk with varying spherical aberration to be added to a light flux. If the values of BE1 and BE2 do not agree with each other, then an astigmatism exists in the direction of either 0 or 90 degrees; the direction is defined such that the astigmatism direction of forming a focal line in parallel to the track direction near the objective lens as the direction of 0 degree. If the values of BE1 and BE2 agree with each other, then any astigmatism does not exist, or an astigmatism may exist in the direction of either 45 or 135 degree.

Accordingly, if the values of BE1 and BE2 do not agree with each other, then the astigmatism in the direction of either zero or 90 degree is to be corrected by controlling an astigmatism correcting element in order to make these values agree with each other. If the values of BE1 and BE2 agree with each other, then a determination is made whether any astigmatism exists or not, and if there is, an angular direction of astigmatism is detected. In this determination, information is used of the polarity and magnitude of focus error signal obtained from the light beam reflected from subspots around a main spot on a medium. Then, the astigmatism in the direction of 45 or 135 degrees is corrected, by controlling the astigmatism correcting element to make the values of the focus error signal obtained from the sub spots become zero, corresponding to the astigmatism angular direction detected.

The present invention enables to specify the existence and amount of astigmatism, and also the angular direction of astigmatism, therefore, an appropriate correction method can be applied thereto each to read/write data in optical disks.

BRIEF DESCRIPTION OF THE DRAWINGS

FIG. 11 is a table of the relation between the magnitude of astigmatism correction and the difference between focus error signals from the land and the groove.

DETAILED DESCRIPTION OF THE INVENTION

The present invention is best described with reference to the accompanied drawings.

Figure 1:
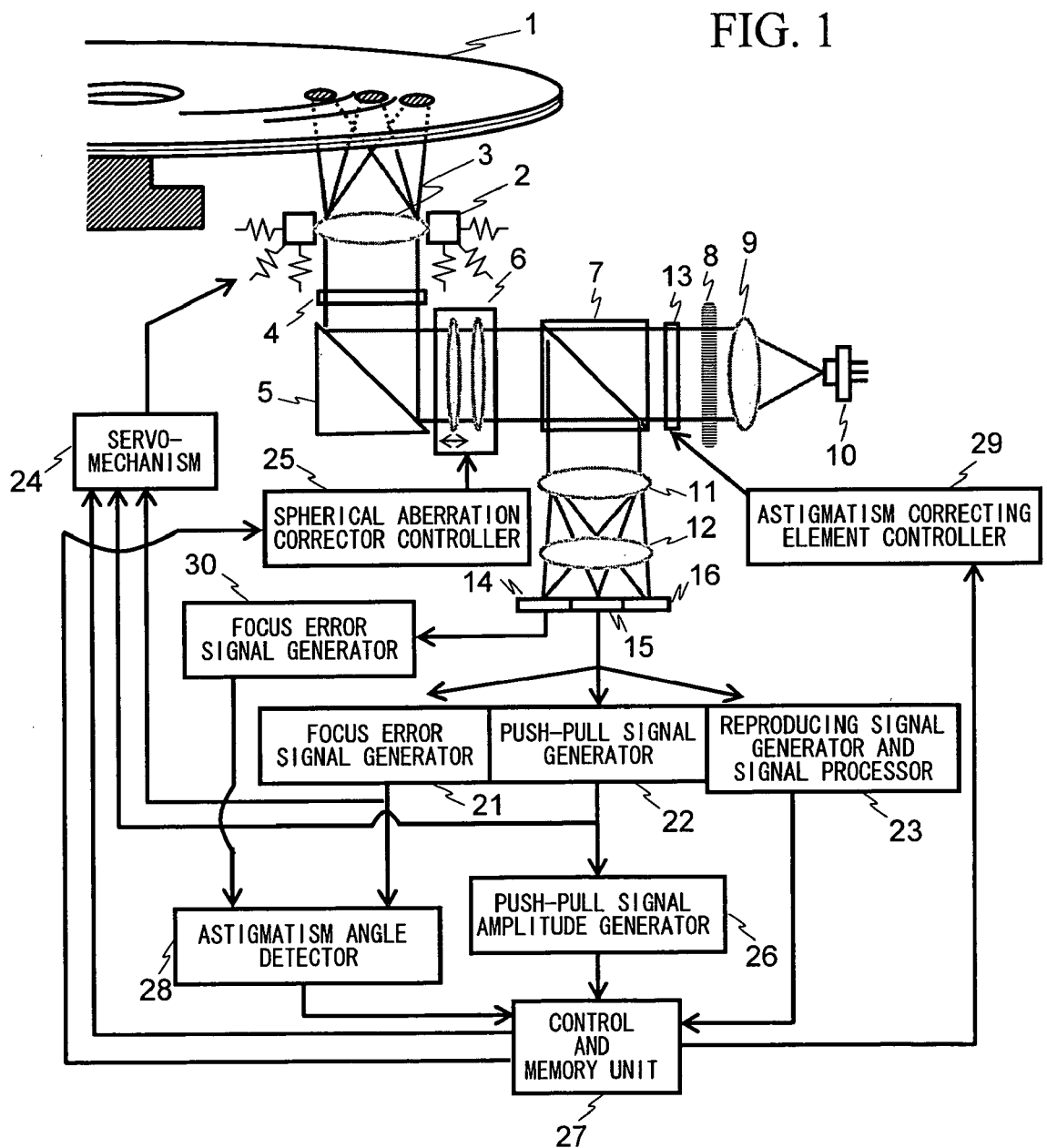
FIG. 1 is a schematic diagram to show the structure of an optical disk apparatus of an embodiment in accordance with the present invention.

FIG. 1 shows a structure of an optical disk apparatus of an embodiment in accordance with the present invention. A linear polarized laser light beam emitted from a semiconductor light source 10 with a wave length of 408 nm is collimated by a collimator lens 9, and split into three beam spots by a diffraction grating 8, and then incident upon an astigmatism correcting element 13 controlled by an astigmatism correcting element controller 29.

A brief explanation is described here about astigmatism. In general, a function representing the wave front for astigmatism with a principal axis having an arbitrary angle θ is given by the following equation (1):

$$W_{as}(\rho, \phi) = K \cdot \rho^2 \cdot \cos[2 \cdot (\phi - \theta)] \quad (1)$$
$$= K \cdot \cos(2\theta) \cdot \rho^2 \cdot \cos(2\phi) + K \cdot \sin(2\theta) \cdot \rho^2 \cdot \cos[2(\phi - 45°)]$$

(where K is a coefficient proportional to the amount of astigmatism, ρ, φ are the variables in the normalized polar coordinate system, and $0 \leq \rho \leq 1$, $0° \leq \phi \leq 360°$).

Using equation (1), astigmatism with a principal axis to an arbitrary angle θ is represented by a combination of an astigmatism with a principal axis in the 0 degree angular component and an astigmatism with a principal axis in the 45 degree angular component.

Figure 10:
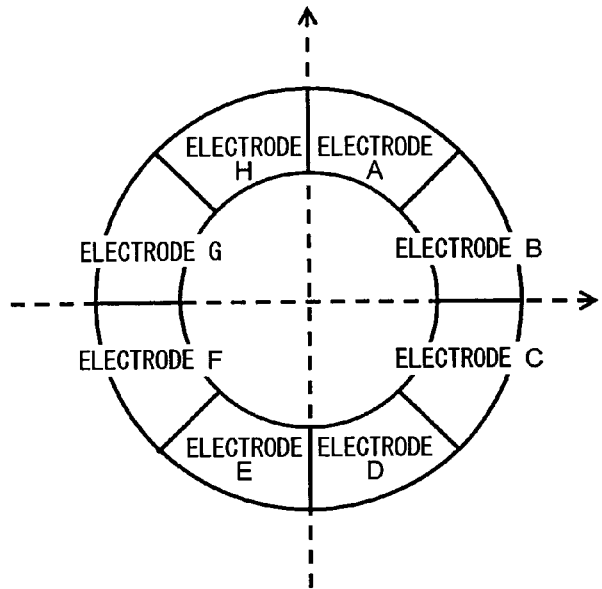
FIG. 10A is a schematic plan view of an astigmatism correcting element of an embodiment in accordance with the present invention.
FIG. 10B is a plan view of the element of FIG. 10A with a voltage distribution for correcting astigmatism in the direction of 0 degree, or 90 degree.
FIG. 10C is a plan view of the element of FIG. 10A with a voltage distribution for correcting astigmatism in the direction of 45 degrees, or 135 degrees.
Figure 10:
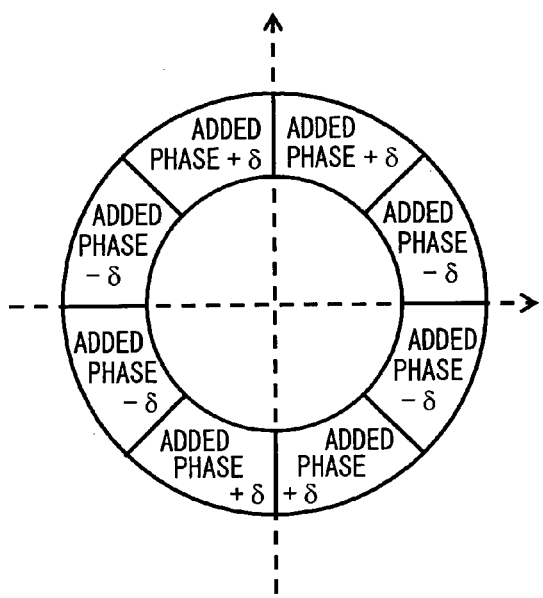
Figure 10:
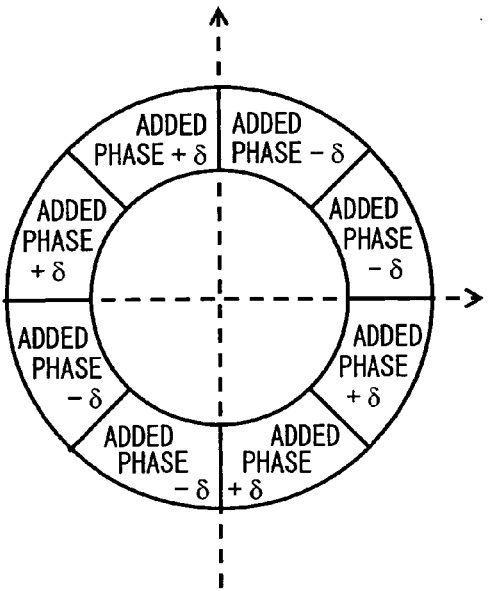

FIG. 10 shows an embodiment of the astigmatism correcting element 13 in accordance with the present invention. The astigmatism correcting element 13 of the embodiment includes a liquid crystal element, wherein 8 transparent electrodes A to H are arranged to divide the liquid crystal element into 8 sections along the circumference as shown in FIG. 10A. Phase in compliance with a voltage applied to each electrode is provided to a laser beam passing through each section of the liquid crystal element with an electrode mounted each. In the case of correction for the astigmatism in the 0 degree direction (and 90 degrees), for example, electric voltages are applied to the electrodes A to H in such a way that the phases are added to the laser beam with a distribution pattern shown in FIG. 10B, similarly, in the case of correction for the astigmatism in the 45 degree direction (and 135 degrees), electric voltages are applied to the electrodes A to H with a phase distribution pattern shown in FIG. 10C. Thus, the astigmatism is corrected. The number of transparent electrodes dividing the liquid crystal element along the circumference is not limited to 8, and the more increased the number of division, the more accurate the astigmatism correction becomes possible. In this embodiment only one liquid crystal element is used, and correction for astigmatism is made, however, depending on the cases a plurality of liquid crystal elements may be used, or a plurality of lenses or the like may also be used.

After passing through the astigmatism correcting element 13, the laser beam passes through a polarized beam splitter 7, and is incidents on a spherical aberration corrector 6. A convex lens and a concave lens are arranged in the spherical aberration corrector 6, and the distance between the convex lens and the concave lens is adjusted by a spherical aberration corrector controller 25, to make the laser beams have a predetermined spherical aberration, and the spherical aberration is thereby corrected. The laser beam with the spherical aberration corrected is deflected from a mirror 5, and after passing through λ/4 plate 4 the beam is circularly polarized, and incident on a optical disk 1 by an object lens 3. An object lens actuator 2 is actuated by a servo-mechanism 24, such that the main central beam is divided into three by a diffraction grating 8 is incident on a groove on the optical disk 1 forming a main spot, whereas the other two are incident on lands forming two side spots, respectively.

The laser beam deflected by the optical disk is focused by the objective lens 3 and transformed to a linearly polarized beam with a polarization axis rotated by 90 degrees with respect to the irradiation light axis by passing through the λ/4 plate 4. Then, the reflected beam from the mirror 5 follows the reverse optical path, that is, the spherical aberration corrector 6, reflected by the polarized beam splitter 7, passing through a detector lens 11, a cylindrical lens 12, and incident upon photo-detectors 14, 15, and 16. At this time, the reflecting light 1 from the groove of optical disk 1 is focused to the photo-detector 15, the reflected light from the land of optical disk 1 is focused to the photo-detector 14, 16. Since recorded information is written only in the grooves, the following procedure is all performed utilizing the signals obtained from the photo detector 15, such as focus adjustment for focus point deviation detection utilizing astigmatism method, tracking adjustment, and reproducing signal generation and signal processing.

Figure 2:
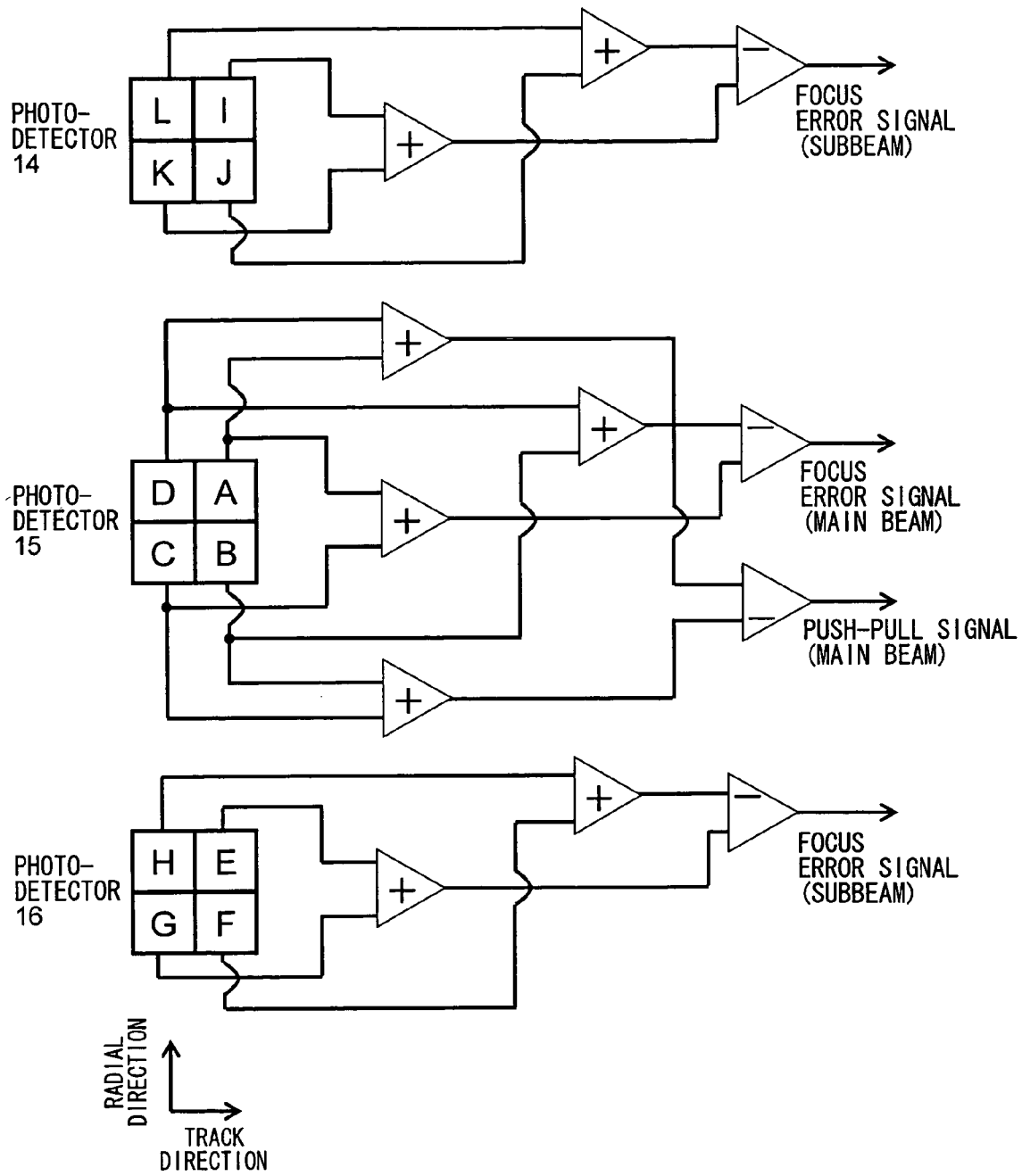
FIG. 2 is a block circuit diagram to show the photo-detectors and the method for calculating various signals from the photo-detector signals.

FIG. 2 is a schematic circuit diagram to generate focus error signals and push-pull signals by the signals from photo-detectors. The photo-detectors 14, 15, and 16 are each divided into 4 sections.

In order to adjust the focus of the system, a focus error signal represented by the following equation (2), is generated by the focus error signal generator 21, the signals are provided thereto from divided sections A, B, C, and D, respectively, of the photo-detector 15, which detects a reflected light from the grooves. The focus adjustment is carried out by controlling the objective lens actuator 2 utilizing the servo-mechanism 24 and by driving the objective lens 3 in the focus direction:

$$\text{Focus error signal} = (A+C) - (B+D) \quad (2)$$

In order to adjust the tracking of the system, a push-pull signal represented by the equation (3), is generated by the push-pull signal generator 22, and then the tracking adjustment is carried out by controlling the objective lens actuator 2 utilizing the servo-mechanism 24 and by driving the objective lens 3 in the radial direction of the optical disk. The signal amplitudes of push-pull signals are then calculated by the push-pull signal amplitude generator 26:

$$\text{Push-pull signal} = (A+D) - (B+C) \quad (3)$$

A reproducing signal generator and signal processor 23 generates the reproducing signal given by the following equation (4), and performs signal processing using the signal produced:

$$\text{Reproducing signal} = A+B+C+D \quad (4)$$

The photo-detector 14 detects the reflected light (subbeam) from the lands, and the divided sections I, J, K, and L of photo-detector 14 produce signals that are fed to the focus error signal generator 30 to generate the focus error signal represented by the equation (5). Similarly, the photo-detector 16 detects the reflected light (subbeam) from the lands, and the divided sections E, F, G, and H of photo-detector 16 produce signals that are fed to the focus error signal generator 30 to generate the focus error signal represented by the equation (6):

$$\text{Focus error signal} = (I+K) - (J+L) \quad (5)$$

$$\text{Focus error signal} = (E+G) - (F+H) \quad (6)$$

Figure 3:
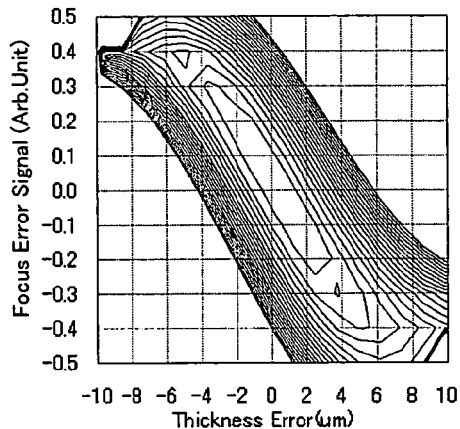
FIG. 3 is the contour maps of push-pull signal amplitude and of 2T mark signal amplitude in the case where there is no astigmatism.
Figure 3:
Figure 3:
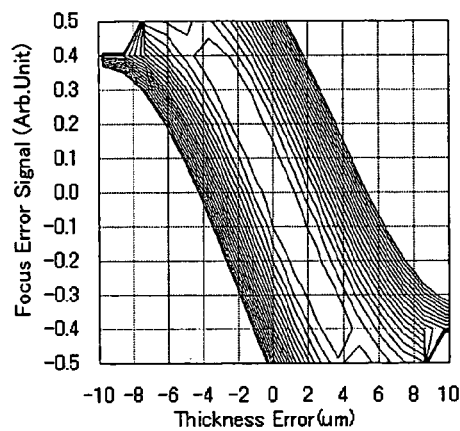
Figure 3:
Figure 3:
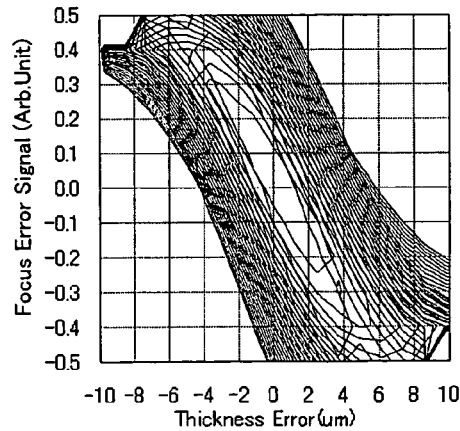

FIG. 3 to FIG. 7 show the contour maps of push-pull signal amplitude in the plane with X-axis for cover layer thickness error of optical disk and Y-axis for defocus (focus error signal normalized to 0 to peak value of the focus error signal at cover layer thickness error of the optical disk being 0), and together with contour maps of reproducing signal amplitude of 2T mark 2T space repetition signal (2T mark signal amplitude) in the plane of cover layer thickness error of optical disk vs. defocus. In the following, an explanation is made of an example wherein the reproducing signal amplitude of the shortest recording mark is adapted from other repetition recording marks, i.e. 2T mark 2T space 2T mark 2T space . . . , however, such repetition recording signals as, 3T mark 3T space 3T mark 3T space . . . , etc may also be used. The reason why such repetition recording signal is adapted for use, is that the absolute value of the signal amplitude is obtained for any optical disks used. FIG. 3 shows the case without any astigmatism, and FIG. 4 to FIG. 7 show the cases wherein the astigmatism of 0.06 λrms (0.294λ for Seidel aberration coefficient) each exists in the direction of 0 degree, 45 degrees, 90 degree, or 135 degrees. The direction of astigmatism is defined in such a way that the direction of zero degree is to form a focal line in parallel to the track direction in the location near the lens.

Figure 4:
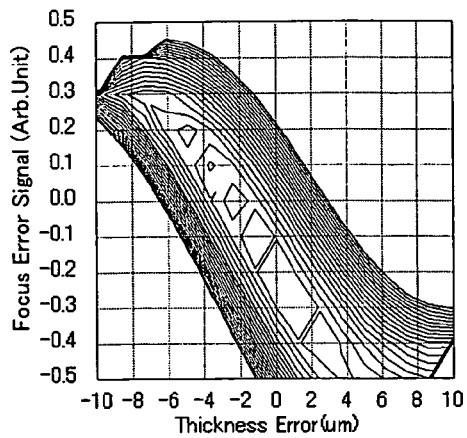
FIG. 4 is the contour maps of push-pull signal amplitude and of 2T mark signal amplitude in the case where there is astigmatism in the direction of 0 degree.
Figure 4:
Figure 4:
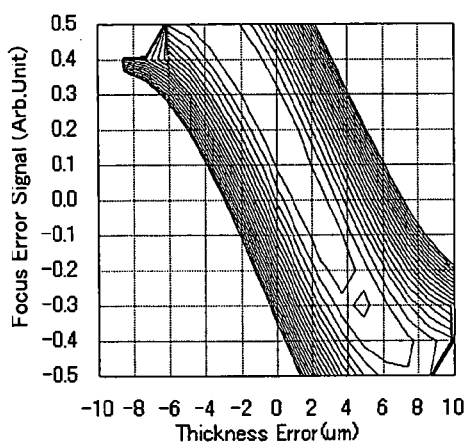
Figure 4:
Figure 4:
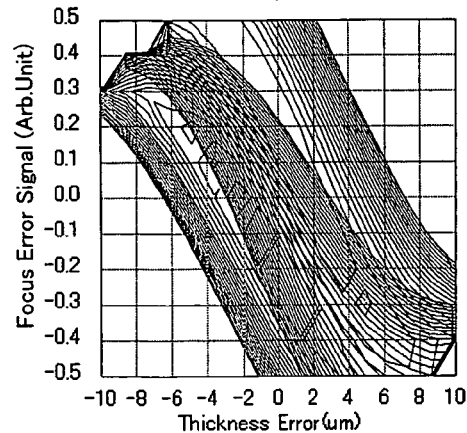
Figure 5:
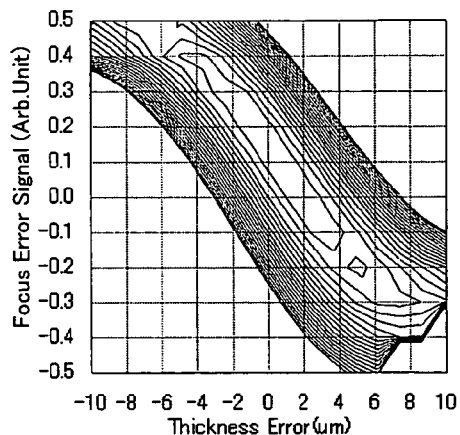
FIG. 5 is the contour maps of push-pull signal amplitude and of 2T mark signal amplitude in the case where there is astigmatism in the direction of 45 degrees.
Figure 5:
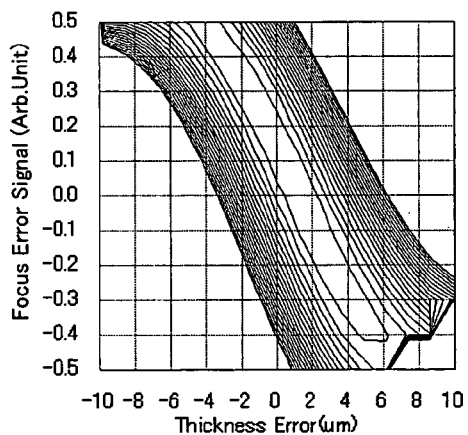
Figure 5:
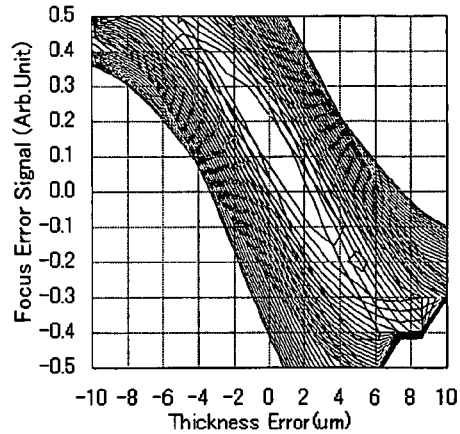
Figure 6:
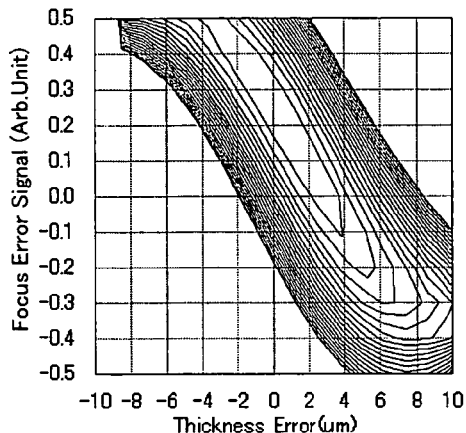
FIG. 6 is the contour maps of push-pull signal amplitude and of 2T mark signal amplitude in the case where there is astigmatism in the direction of 90 degree.
Figure 6:
Figure 6:
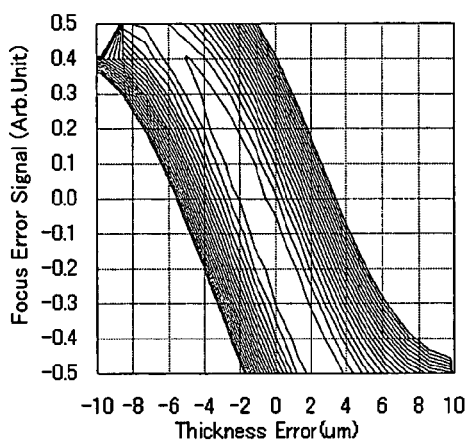
Figure 6:
Figure 6:
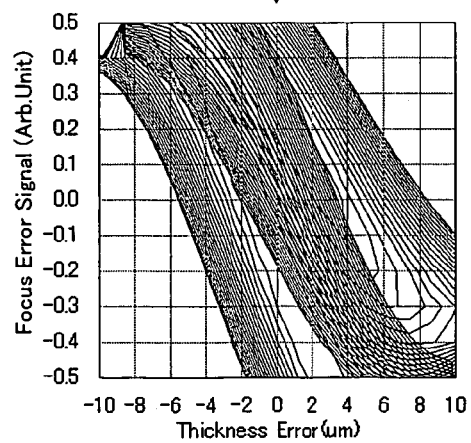
Figure 7:
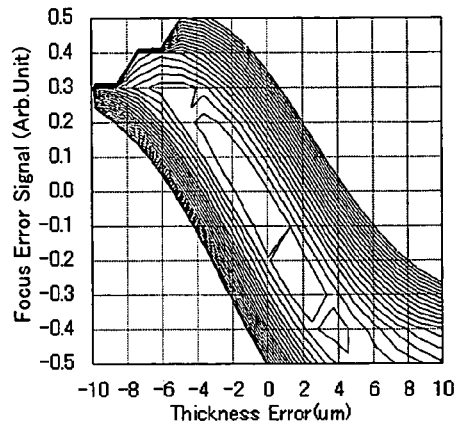
FIG. 7 is the contour maps of push-pull signal amplitude and of 2T mark signal amplitude in the case where there is astigmatism in the direction of 135 degrees.
Figure 7:
Figure 7:
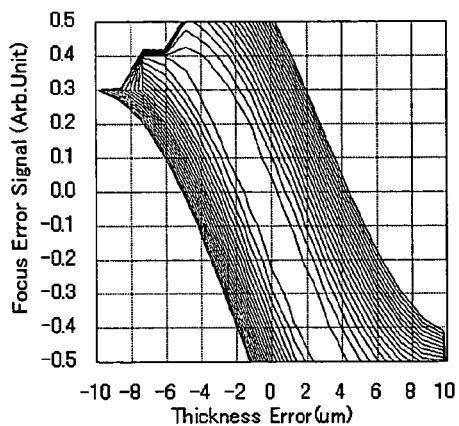
Figure 7:
Figure 7:
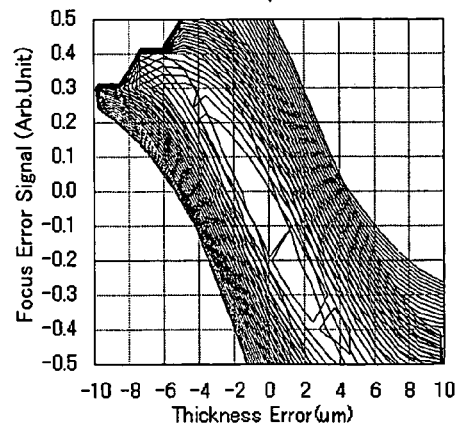

As shown in FIG. 4 and FIG. 6, in the case where there exists astigmatism in the direction of 0 degree (FIG. 4), or 90 degrees (FIG. 6), the position of push-pull signal amplitude maximum point (P. P. max) with the focus error signal being 0, is separated from the position of cover layer thickness error (amount of correction for spherical aberration) where the maximum point of 2T mark signal amplitude becomes maximum (2T amplitude max). However, as shown in FIG. 3, FIG. 5, and FIG. 7, in the case where there exists no astigmatism (FIG. 3) or exists astigmatism in the direction of 45 degrees (FIG. 5), or 135 degrees (FIG. 7), P. P. max and 2T amplitude max overlaps approximately.

From the above arguments, the amount of astigmatism can be determined from the amount of difference between the cover layer thickness error at P. P. max (spherical aberration correction amount), and the cover layer thickness error at 2T amplitude max (amount of spherical aberration correction), and the direction of astigmatism can also be determined whether the astigmatism is in the direction of 0 degree or 90 degree from the positional relation of the P. P. max and 2T amplitude max. Furthermore, the relationship is determined and stored in memories, of the difference between the cover layer thickness error at P. P. max, and the cover layer thickness error at 2T amplitude max, to the amount of astigmatism in the direction of 0 degree, or 90 degree, then the required amount of correction for astigmatism is determined immediately from the difference detected, and in the first step, a coarse adjustment (correction) is made utilizing the information stored in the memory alone, then a fine adjustment is made in the second step, enabling the time required to study the astigmatism correction shorter.

On the other hand, in the case where there exists no astigmatism, or exists astigmatism in the direction of 45 degrees, or 135 degrees, the positions of the P. P. max and the cover layer thickness error (amount of spherical aberration correction) at 2T amplitude max overlap, so that whether there is astigmatism or not is not to be known, and furthermore, neither the amount nor the direction of astigmatism can be determined even if an astigmatism exists. Accordingly, in such cases as the above, the amount of astigmatism is estimated either from the difference between the focus error signal from main beam and the either of two focus error signal from subbeam, or from the difference between the focus error signal from main beam and the signal added the focus error signal from main beam to two subbeam focus error signals (enabling to detect the crosstalk to be canceled by the difference astigmatism method), the angular direction and the existence of astigmatism can be estimated from the polarity of either two subbeam focus error signals, or from the polarity of sum signal of two subbeam focus error signals.

Figure 8:
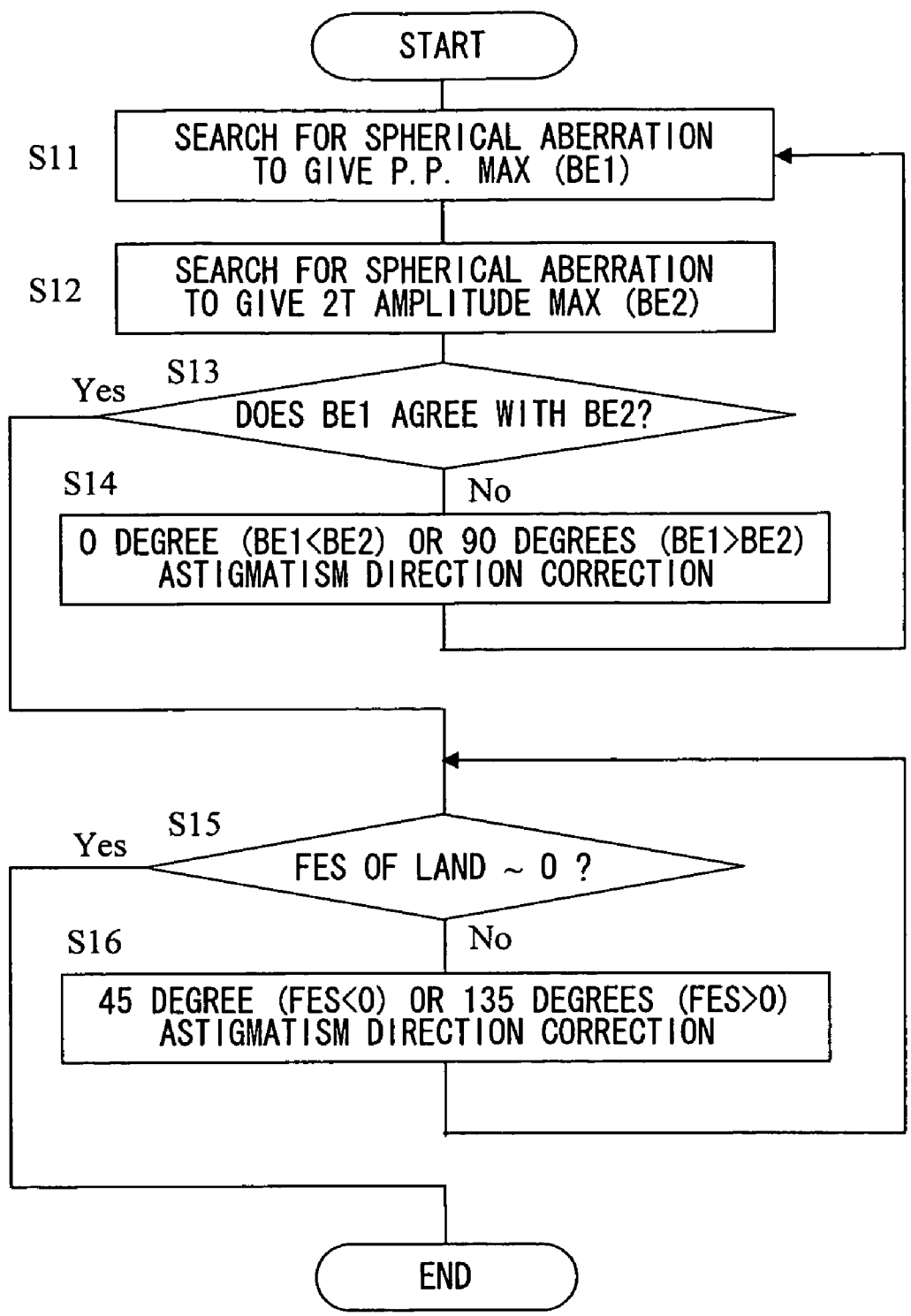
FIG. 8 is a flow chart to show the processing sequence for astigmatism correction in accordance with the present invention.

By applying the above method to astigmatism, the existence, the amount, and the angular direction thereto can be determined, and an appropriate correcting procedure is taken each corresponding to any of them, enabling to read/write more clearly. FIG. 8 shows a flow chart of the sequence for astigmatism correction study in accordance with the present invention.

In referring to FIGS. 3 to 7, those states wherein auto focus and tracking control are performed by the servo-mechanism 24, are shown along the abscissas(X-axis) at the ordinate(Y-axis), Y: Focus Error Signal=0. In these states, the variation of magnitude of push-pull signal amplitude is observed with changing the amount of spherical aberration (X: the cover layer thickness error) by varying an optical element in the spherical aberration corrector 6. The maximum value of push-pull signal amplitude is, thus searched (S 11) yielding the amount of spherical aberration (BE1) at this point. Similarly, the amount of spherical aberration (BE2) is searched at the maximum amplitude of 2T mark signals calculated from the reproducing signal generator and signal processor 23 (S12). (The push-pull signal amplitude and 2T signal amplitude has a distribution shown in FIG. 3 to FIG. 7 (the figures show the range of 0.8 to 1 after standardization)

Next, comparison is made of the values BE1 and BE2 searched (and stored) in the process, and if the values BE1 and BE2 do not agree with each other (No in S13), then correction is made for the astigmatism in the direction of 0 degree or 90 degree by the astigmatism correcting element 13 until the agreement is reached between BE1 and BE2 (S14). If the agreement is reached between BE1 and BE2 (Yes in S13), the process proceeds to step 15 for further comparison. The study sequence is not limited to the one shown in FIG. 8. And also only a part of the sequence may be applied such that the process of correction may be utilized for astigmatism in the direction of 0 degree or 90 degrees or in the direction of 45 degrees or 135 degrees.

First, in the case where BE1 and BE2 do not agree with each other, the process performed by the astigmatism correcting element 13 is explained more in detail. If BE1 and BE2 do not agree, two cases are included, these are: (1) BE1<BE2, (2) BE1>BE2.

(1) BE1<BE2

In this case, there exists astigmatism in the direction of 0 degree as shown in FIG. 4. Accordingly, correction for the astigmatism is performed by the astigmatism correcting element 13, a liquid crystal element, through the astigmatism correcting element controller 29 with an instruction transmitted from the control and memory unit 27 to correct astigmatism in the direction of 0 degree as shown in FIG. 10B, until the agreement is reached between BE1 and BE2. After the correction, the process goes back to step 11, the amount of difference between BE1 and BE2 is determined, and the process is repeated until the amount of difference reaches zero. When BE1=BE2 is reached, the process ends of correction for the astigmatism in the direction of 0 degree.

(2) BE1>BE2.

In this case, there exists astigmatism in the direction of 90 degree as shown in FIG. 6. Accordingly, an instruction is transmitted from the control and memory unit 27 to the astigmatism correcting element controller 29 to add a phase with an inverse polarity to the one for astigmatism in the direction of 0 degree as shown in FIG. 10B, until the agreement is reached between BE1 and BE2. After the correction, the process goes back to step 11, the amount of difference between BE1 and BE2 is determined, and the process is repeated until the amount of difference reaches zero. When BE1=BE2 is reached, the process ends of correction for the astigmatism in the direction of 90 degree.

Astigmatism in the direction of 90 degree is equivalent to the one in the direction of 0 degree with the polarity for the astigmatism reversed. Similarly, the astigmatism in the direction of 135 degrees is equivalent to the one in the direction of 45 degrees with the polarity for the astigmatism reversed. Therefore, for correction for the astigmatism in the direction of 0 degree or 90 degree, a search may be performed until the difference reaches 0 by varying correction for the astigmatism from positive values to negative ones.

In the case where BE1 and BE2 do not agree with each other as described above, if the relationship is determined and stored in a computer memory or the like between the amount of difference between the two spherical aberration correction amounts and the amount of astigmatism, then the amount required for correction for astigmatism can be determined immediately from the above amount of difference. Therefore, for example, if the amount of difference is 5.15, in the first step, a coarse adjustment is quickly performed to correct astigmatism corresponding to the difference amount of 5.00 using the above mentioned relationship. Then the procedure from step 11 of study sequence shown in FIG. 8 is performed. Then in the second step, a fine adjustment is performed to correct the remaining astigmatism corresponding to 0.15. The procedure is repeated from step 11 shown in FIG. 8, until the agreement is reached between BE1 and BE2, thereby reducing the time required for astigmatism correction.

Next, the processing is explained for the case where BE1 and BE2 agree with each other.

(3) BE1=BE2.

In this case, first, correction is assumed to be made for the astigmatism in the directions of 0 degree, and 90 degree. However, the cases are still included wherein there in no astigmatism present, there is astigmatism in the direction of 45 degrees, and in the direction of 135 degrees as shown in FIG. 3, FIG. 5, and FIG. 7. Therefore, the process proceeds to step 15, wherein specification is performed of the amount of astigmatism and also the angular direction of astigmatism, using the focus error signal from the lands, and the crosstalk to be canceled from the above-mentioned differential astigmatism method.

Here, an explanation is made of detecting the astigmatism in the direction of 45 degrees or 135 degrees. The differential push-pull method is well known, wherein an off-set due to the lens movement associated with tracking operation, is canceled from the difference between the push-pull signal of the main beam and the added signals of the push-pull signal of two subbeams, while the main beam is arranged to be incident on the groove, and two subbeams are arranged to be incident on the lands. Furthermore, the combination of the above method with the focus error detection method with astigmatism, that is, the differential astigmatism method is also known, wherein the crosstalk of focus error signal produced when a spot crosses the tracks is canceled from the signal added the focus error signal of the main beam to the added signals of the focus error signal of two subbeams. Since the crosstalk becomes large if there is astigmatism in the direction of 45 degrees and 135 degrees, the crosstalk to be canceled by the differential astigmatism method can be detected from the difference between the focus error signal of the main beam and the added signals of the focus error signal of two subbeams. However, the signals are much smaller than that from the main spot, e.g. of the order of 1/15 since the signals from the lands are obtained from the subspots divided by the diffraction grating 8. Accordingly, a signal e.g. amplified by the astigmatism angle detector 28 by 15 times, are used.

The crosstalk signal for tracking error to the focus error signal becomes a cosine waveform for track deviation if the crosstalk arising from astigmatism. Therefore, the difference signal is proportion to the amount of astigmatism in tracking operation.

Figure 9:
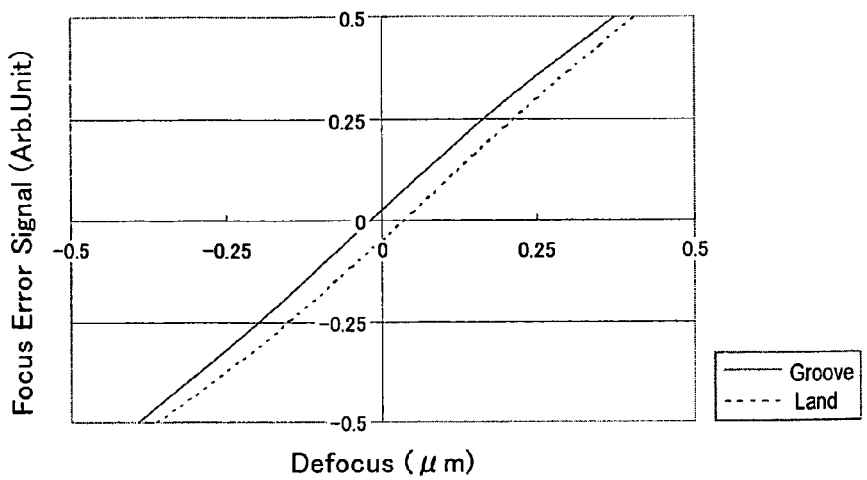
FIG. 9A is a graph to show the relation of focus error signal in arbitrary unit vs. defocus in µm unit in the case where there is no astigmatism. The solid line is for reflected light from the groove, and the dotted line for reflected light from the lands.
FIG. 9B is a graph to show the relation of focus error signal in arbitrary unit vs. defocus in µm unit in the case where there is astigmatism in the direction of 45 degrees. The solid line is for reflected light from the grooves, and the dotted line for reflected light from the lands.
FIG. 9C is a graph to show the relation of focus error signal in arbitrary unit vs. defocus in µm unit in the case where there is astigmatism in the direction of 135 degrees. The solid line is for reflected light from the grooves, and the dotted line for reflected light from the lands.
Figure 9:
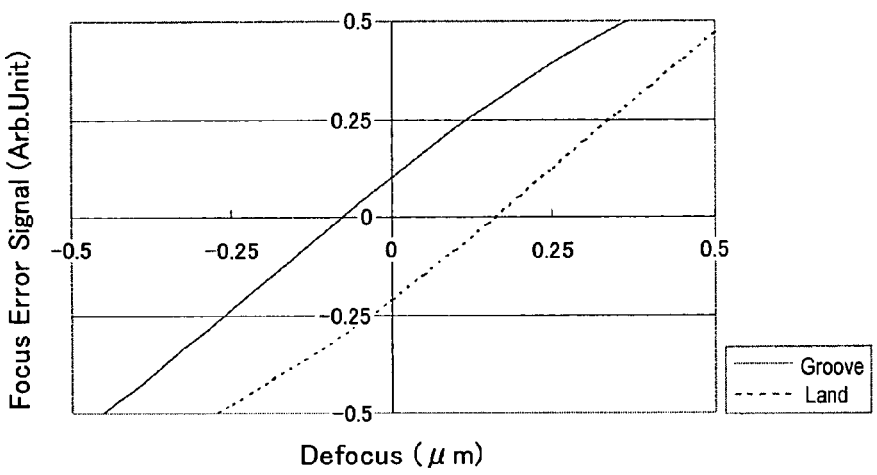
Figure 9:
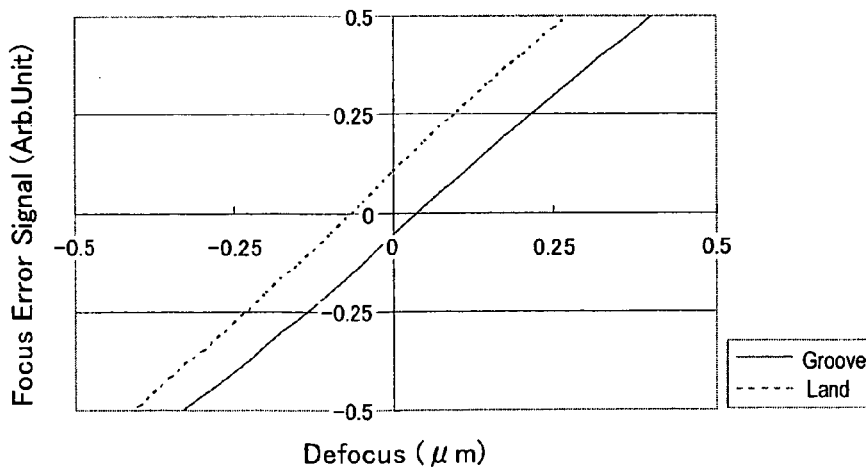

FIG. 9A shows focus error signals both groove and land in the case where there is no astigmatism present, FIG. 9B in the case wherein there is astigmatism in the direction of 45 degrees, and FIG. 9C in the case wherein there is astigmatism in the direction of 135 degrees. The focus error signal is represented in arbitrary unit, whereas, the defocus in µm unit, and focus error signal from the groove are indicated by solid lines, whereas, those from the lands in broken lines.

In step 15, determination is executed for detecting the astigmatism angular direction of 45 degrees or 135 degrees, wherein an auto-focus procedure is in operation (focus error signal from the groove is zero). The cases where the focus error signal from the land is not zero (S 15 indicates No), are divided into two cases, (i) the focus error signal from the land is positive, (ii) the focus error signal from the land is negative.

(i) The Focus Error Signal from the Land is Positive

In this case, since there is astigmatism in the direction of 135 degrees as shown in FIG. 9C, correction for astigmatism is performed to make the focus error signal from the land approach to zero, i.e., the case of FIG. 9A. That is, the correction is carried out by transmitting an instruction from the control and memory unit 27 to the astigmatism correcting element controller 29, to correct the astigmatism in the direction of 135 degrees (added phase in FIG. 10C has the opposite polarity). After the correction, measurements are made of the focus error signals from the lands, and the procedure is repeated until the focus error signal from land reaches zero, then, the procedure ends to correct the astigmatism in the direction of 135 degrees.

(ii) The Focus Error Signal from the Land is Negative.

There is a case where no astigmatism present, and another case where astigmatism is present in the direction of 45 degrees as shown in FIG. 9A and FIG. 9C. However, the value of focus error signal for the case where astigmatism is present in the direction of 45 degrees is larger than the value of focus error signal by about 4 times for the case where astigmatism is not present. If the focus error signal is such a large value, there exists astigmatism in the direction of 45 degrees, correction for the astigmatism is performed in such a way that the value of focus error signal from the land approaches to zero, i.e. the case where no astigmatism present. That is, the correction is carried out by transmitting an instruction from the control and memory unit 27 to the astigmatism correcting element controller 29, to correct the astigmatism in the direction of 45 degrees as shown in FIG. 10C. After the correction, measurements are made of the focus error signals from the lands, and the procedure is repeated until the focus error signal reaches zero, then, the procedure ends to correct the astigmatism in the direction of 45 degrees.

On the other hand, in the case where the focus error signals from the lands are zero or sufficiently small, then astigmatism scarcely exist, and the correction ends for the astigmatism in the direction of 45 degrees.

In the case where an apparatus arrangement is adapted, wherein the computation is made from the following equation (7) instead of the equation (2) with the photo-detector having four divided sections as shown in FIG. 2, correction for the astigmatism is performed in the direction of 135 degrees, if the sign is negative of the focus error signal from the land, whereas correction for the astigmatism is performed in the direction of 45 degrees, if the sign is positive:

$$\text{Focus error signal} = (B+D)-(A+C) \quad (7)$$

Furthermore, the amount required for correction for astigmatism can be immediately determined from the focus error signal from the land, if the relation of the amount required for correction for astigmatism to the focus error signal from the land is stored in a memory or the like as illustrated in Table 11. For example, if the focus error signal from the land is 0.22, then in the first step, a coarse correction for the astigmatism corresponding to 0.20 is made using the above information stored in the memory, then a fine correction is made for the remaining astigmatism until the focus error signal from the land approaches to zero. In this way, the time period may also be reduced appreciably for studying the correction for astigmatism. Still further, the amount for correction for astigmatism is approximately proportional to the focus error signal from the land as shown in Table 11, hence, an appropriate coefficient is multiplied to the difference between zero and the observed focus error signal, the resulting value is transmitted as an instruction to the astigmatism correcting element controller 29, to be used for the correction.

According to the present invention, the amount and angular direction of astigmatism are detected to enable correction for astigmatism appropriately depending on the feature of astigmatism detected. Therefore, an accurate reproduction is implemented of various recorded data in information storage media. In the embodiments described above, explanation is made for correction for the astigmatism with an arbitrary angular direction, however, in the case wherein approximate information of astigmatism is already known, there is no need to follow all the sequence shown in FIG. 8, and only a part of the sequence needed may be executed to correct the astigmatism.

What is claimed is:

1. An optical disk apparatus comprising:
   a light source;
   a spherical aberration corrector thereby adding a spherical aberration to the light flux from the light source;
   an astigmatism correcting element thereby adding astigmatism to the light flux;
   an objective lens converging a light flux passed through the spherical aberration corrector and the astigmatism correcting element to an optical disk, and converging a reflection light from the optical disk;
   an actuator to drive the objective lens in the focus direction and in the vertical direction thereto;
   a photo-detector detecting the reflected light;
   a focus error signal generator to generate a focus error signal from the output of the photo-detector;
   a push-pull signal generator to generate a push-pull signal from the output of the photo-detector;
   a reproduction signal generator to generate a reproduction signal from the output of the photo-detector; and
   a controller to control the spherical aberration corrector, the astigmatism correcting element, and the actuator;
   wherein the controller adjusts the objective lens to focus by controlling the actuator based on the focus error signal, and controls and tracks the actuator based on the push-pull signal, and reads the push-pull signal and the reproduction signal by varying an amount of spherical aberration to be added to the light flux by the spherical aberration corrector, furthermore, if an amount of spherical aberration yielding a maximum amplitude of the push-pull signal, and an amount of spherical aberration yielding a maximum amplitude of the reproduction signal do not agree, the controller also adjusts the astigmatism correcting element to make the both amounts agree, and makes correction for astigmatism in the direction of 0 degree or 90 degrees, defining the astigmatism direction forming a focal line in parallel to the track direction near the objective lens as zero degree.

2. The optical disk apparatus according to claim 1, wherein the amplitude of the reproduction signal is the amplitude of the shortest mark reproduction signal.

3. The optical disk apparatus according to claim 1, wherein the optical disk apparatus includes an memory storing an amount of spherical aberration yielding the maximum amplitude of the push-pull signal, an amount of spherical aberration yielding the maximum amplitude of the reproduction signal, the difference between the preceding two amounts, and the relation between the difference and an amount of astigmatism in the direction of 0 degree or 90 degrees to be given.

4. The optical disk apparatus according to claim 1, wherein the photo-detector is divided into 4 sections.

5. The optical disk apparatus according to claim 1, wherein the astigmatism correcting element comprises a liquid crystal element having a transparent electrode divided into at least 8 sections.

6. An optical disk apparatus comprising:
   a light source;
   an optical element for dividing light flux from the light source;

a spherical aberration corrector for adding a spherical aberration to the light flux;

an astigmatism correcting element for adding astigmatism to the light flux;

an objective lens for converging the light flux to an optical disk as a main spot and a subspot, and converging reflected light beans from the optical disk;

an actuator for driving the objective lens in the focus direction and in the vertical direction thereto;

a first photo-detector for detecting a reflected light beam from the main spot of the optical disk;

a second photo-detector for detecting a reflected light beam from the sub spot of the optical disk;

a first focus error signal generator for generating a first focus error signal from an output of the first photo-detector;

a push-pull signal generator for generating a push-pull signal from an output of the first photo-detector;

a second focus error signal generator for generating a second focus error signal from an output of the second photo-detector; and a controller for controlling the spherical aberration corrector, the astigmatism correcting element, and the actuator, wherein characterized in that the controller adjusts the objective lens to focus by controlling the actuator based on the first focus error signal, controls and tracks the actuator based on the push-pull signal, detects an astigmatism angular direction depending on the polarity of the second focus error signal, by defining the astigmatism direction of forming a focal line in parallel to the track direction near the objective lens as zero degree, controls the astigmatism correcting element to make the second focus error signal approach to zero corresponding to the detected angular direction, and makes correction for astigmatism in the direction of 45 degrees or 135 degrees.

7. The optical disk apparatus according to claim 6, wherein correction is made for astigmatism in the direction of 45 degrees or 135 degrees depending on the polarity of the second focus error signal.

8. The optical disk apparatus according to claim 6, wherein the optical disk apparatus includes an memory storing the relation between the second focus error signal and the amount of astigmatism in the direction of 45 degrees or 135 degrees to be given by the astigmatism correcting element.

9. The optical disk apparatus according to claim 6, wherein characterized in that the first photo-detector and the second photo-detector are each divided into four sections.

10. The optical disk apparatus according to claim 6, wherein the astigmatism correcting element is controlled by an instruction proportional to the value of the second focus error signal.

11. The optical disk apparatus according to claim 6, wherein the astigmatism correcting element comprises a liquid crystal element having a transparent electrode divided into at least eight sections.

12. The optical disk apparatus according to claim 6, wherein the optical disk apparatus includes a third photo-detector, and a third focus error signal generator for generating a third focus error signal from an output of the third photo-detector, wherein the optical element performs to divide a light flux from the light source into three, the objective lens converges the light flux to the optical disk as a main spot and two sub spots, the second and third photo-detectors detect reflected light from the two sub spots, respectively, and focus control is performed based on a signal added the first focus error signal to the second focus error signal and the third focus error signal.

13. The optical disk apparatus according to claim 6, wherein the third photo-detector is divided into four sections.

14. The optical disk apparatus according to claim 6, wherein the optical disk apparatus includes a sum signal generator for generating a sum signal of the second focus error signal and the third focus error signal.

* * * * *